US005917986A

United States Patent [19]

[11] Patent Number: 5,917,986
[45] Date of Patent: Jun. 29, 1999

Vanderreydt et al.

[54] LARGE-AREA FIBER OPTIC DISPLAY USING PIEZOELECTRIC SHUTTERS

[75] Inventors: Jean-Pierre Vanderreydt, Brussels, Belgium; Alistair Allen Miller, Peachland, Canada

[73] Assignee: Remote Source Lighting International (Malaysia) Sdn. Bhd., Selangor Darul Eshan, Malaysia

[21] Appl. No.: 08/869,364

[22] Filed: Jun. 5, 1997

[51] Int. Cl.$^6$ ........ G02B 6/00
[52] U.S. Cl. ........ 385/147; 385/9; 385/120
[58] Field of Search ........ 385/115, 116, 385/120, 121, 147, 901, 9; 359/259, 264

[56] References Cited

U.S. PATENT DOCUMENTS 4,844,577 7/1989 Ninnis et al. ........ 385/9
5,052,777 10/1991 Ninnis et al. ........ 385/19
5,563,977 10/1996 Cassarly et al. ........ 385/115
5,661,611 8/1997 Kim et al. ........ 359/871

OTHER PUBLICATIONS

"Lage Area Fiber–Optic Display Using Piezoelectric Sheutters" Jean–Pierre Vanderreydt; SID 95 Digest pp. 311–314.

*Primary Examiner*—Phan Palmer
*Attorney, Agent, or Firm*—Foley, Hoag & Eliot

[57] ABSTRACT

A piezoelectric shutter is arranged in a comb pattern and presents a core. The comb is provided with at least one tooth constituting the shutter, the bore being arranged with elevation allowing the displacement of the shutter by the piezoelectric effect. The device is remarkable in that it comprises at least one bimorph arranged on the support, capable of being raised with respect to the support by the piezoelectric effect.

26 Claims, 7 Drawing Sheets

LARGE-AREA FIBER OPTIC DISPLAY USING PIEZOELECTRIC SHUTTERS

FIELD OF THE INVENTION

The present invention relates to the use of light shutters for switching light from the end of optical fibers, and more particularly to the use of piezoelectric bimorphs as light shutters for display screen applications.

BACKGROUND OF THE INVENTION

Large-area displays, such as animated scoreboards for sporting venues, and the like, are, of course, well known in the art. Typically, such displays are of the type known as secondary emission displays, wherein the light emerges from such sources as cathode ray tubes (CRTs) and television type screens. The problem with such displays is that the phosphor light emission from them is limited in intensity, and they therefore typically suffer from low contrast and poor visibility during high ambient lighting conditions.

The use of bimorph light modulators, at least in theory, is known as a means of overcoming some of the aforementioned problems with conventional large-area displays. Such systems are disclosed, for example, in U.S. Pat. Nos. 4,844,577 and 5,052,777, both of which were at issue assigned to Sportsoft Systems, Inc. of Burnaby, Canada. The advantage of such systems is that a display using bimorphs is not limited in the intensity of light at each pixel location by the physical nature of any secondary emission type material such as phosphor. Further, such a display can be made very large since the light from the source can be directed to very large numbers of pixels by optical channels such as fiber optic light guides, and there is no need for deflecting an electron beam to raster scan the entire display.

The problem with the approach taken the in the Sportsoft patents, and other like approaches, is that the assembly of such bimorph systems is exceedingly complex and labor intensive, and the result is a system which has difficulty competing in the marketplace. There is thus a need for an improved bimorph system which is simpler than prior art systems, and which lends itself to adaptation to automated manufacturing methods.

SUMMARY OF THE INVENTION

The present invention relates to a piezoelectric shutter arranged in a comb pattern presenting a central structure which is equipped with at least one tooth constituting the shutter, the central structure being raised, thus allowing the displacement of the shutter by the piezoelectric effect. Such an approach is very effective in minimizing labor costs and improving the capability of volume production.

The corresponding known means of the state of the art present serious drawbacks. The present invention is intended to overcome these drawbacks.

Thus, the invention proposes at least one bimorph arranged on a support and capable of being raised with respect to the latter by the piezoelectric effect, allowing a shutter action.

In a preferred embodiment, each above-mentioned bimorph is glued to said comb support.

In an advantageous embodiment, the gluing material is deposited dropwise so as to allow a capillary effect capable of exerting a displacement action. The result is that the bimorphs, which are ultralight, are properly aligned so that a precise positioning can be obtained, thus making the shuttering system highly reliable.

In a more advantageous embodiment, the gluing material selected is a polymerizable material. Thus, when the polymerization of the gluing material takes place after the gluing operation itself, a shrinkage effect occurs.

In an even more advantageous embodiment, the gluing material is sensitive to ultraviolet radiation. Thus, when the radiation is directed onto the gluing zone, it promotes the fixation by gluing of each bimorph.

In a specific embodiment of the invention, each bimorph is folded at one of its extremities over a certain angle, preferably in the direction of the above mentioned support, though it could be folded in either direction if desired. This construction ensures the direct shuttering by the bimorph itself. The piezoelectric effect causes a simultaneous lifting of the bimorphs, so as to ensure the passage of the light or, on the other hand, a lowering into a rest position, ensuring the shuttering.

In a more specific embodiment of the invention, in which each bimorph is folded essentially at a right angle, a convenient shuttering effect is thus ensured.

In an even more specific embodiment, a stop is arranged in the device that limits the lifting stroke of the bimorph to prevent vibrations that induce errors.

In a preferred embodiment of the invention, the above-mentioned stop is arranged overhanging and from the folded end of the bimorph towards its opposite end so as to prevent the portion of the above-mentioned angle from hitting the stop. In this manner, the edge of the angle of the bimorph is prevented from remaining adhered to the stop during the opening and closing of the shutter and thus causing a perturbation in the correct operation of the shutter.

The invention, together with additional features and advantages thereof, may best be understood by reference to the following description taken in conjunction with the accompanying illustrative drawing.

DESCRIPTION OF THE PREFERRED EMBODIMENT

The present invention can be applied, notably, in large-surface optical fiber display devices in which piezoelectric shutters are used according to the invention. The availability of new polymer piezoelectric materials has made possible the development of high-brightness new light shutters. In the case of usage for switching of light at the end of optical fibers, it is possible to conceive of large-scale video color display devices.

The development of xenon designed to effectively and uniformly feed small fiber bundles currently makes it possible to develop display devices with very high luminance. A system of this type is described below.

Piezoelectric materials are well known. They are crystals like quartz or ceramics like PZT. Piezoelectricity originates from the existence of a permanent internal polarization in dielectrics. The mechanical tension modifies the dipole moments, and then an external electrical field is generated. Conversely, if an exterior electrical field is applied, the dipoles reorient themselves, and a mechanical deformation is induced.

Recently, piezoelectric polymers have been developed. They are available in sheets and rolls with thicknesses between 9 $\mu$m and 1 mm, and they are used in numerous applications (notably as light gates).

Figure 1:
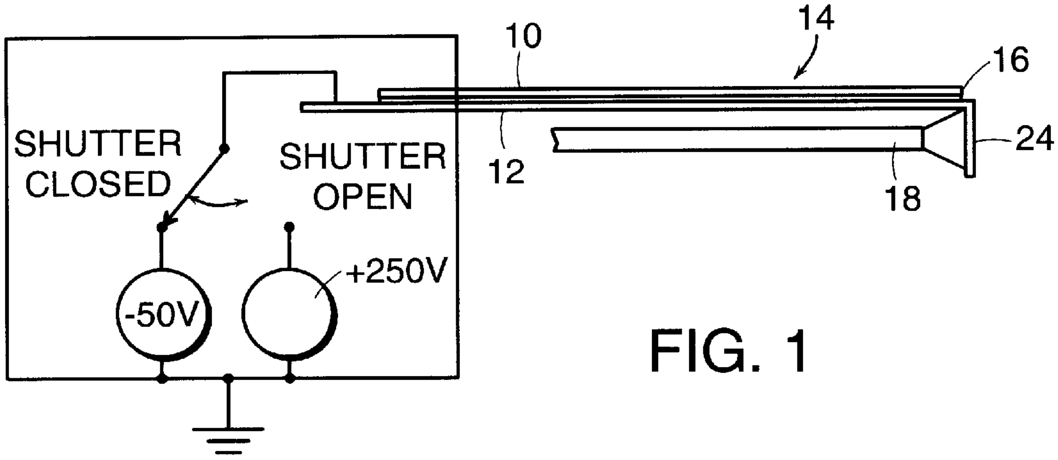
FIG. 1 is a schematic view of a piezoelectric shuttering system constructed in accordance with principles of the invention.

Referring now to FIG. 1, two sheets of piezoelectric polymers 10 and 12 with opposite polarities are glued together, forming a bending element, or bimorph 14.

When stress is applied, resulting in an applied voltage, one of the layers 10, 12 elongates or dilates, whereas the other contracts, causing the assembly to fold or bend. When stress is applied with reverse polarity, the bimorph is folded in the opposite direction. The bimorph configuration transforms small variations in length into movements of the end 16 of the bimorph.

If the end 16 is folded at a right angle, and when the assembly is placed above an optical fiber 18 as illustrated in FIG. 1, the end will switch the light exiting from the stopped fiber and the open fiber, respectively.

Figure 2:
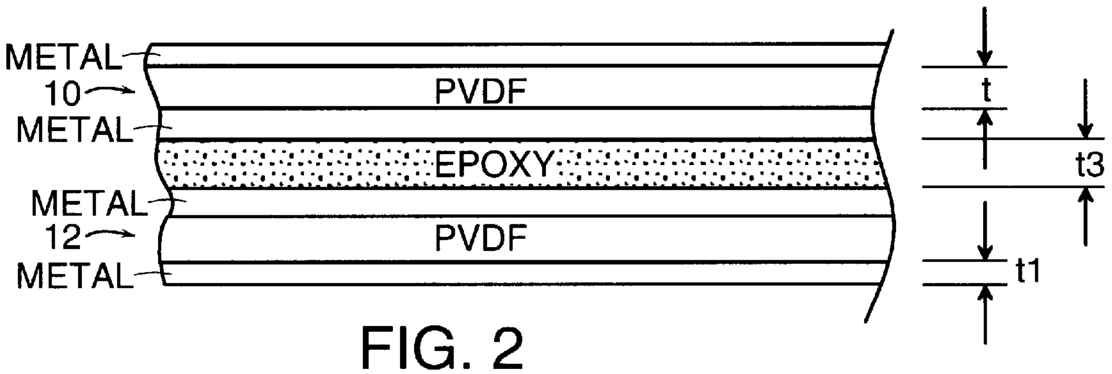
FIG. 2 is a cross-sectional view of a piezoelectric bimorph for use as a fiber optic shutter.

Experiments have been performed on the deflection/inflection of a bimorph showing the effect of the stratification of the glue of the metal forming the superimposed layers of the bimorph, as illustrated in FIG. 2. When the model is extracted from the latter, it results in a criterion for the selection of the length, the glue, and the thickness of the metal.

Figure 3:
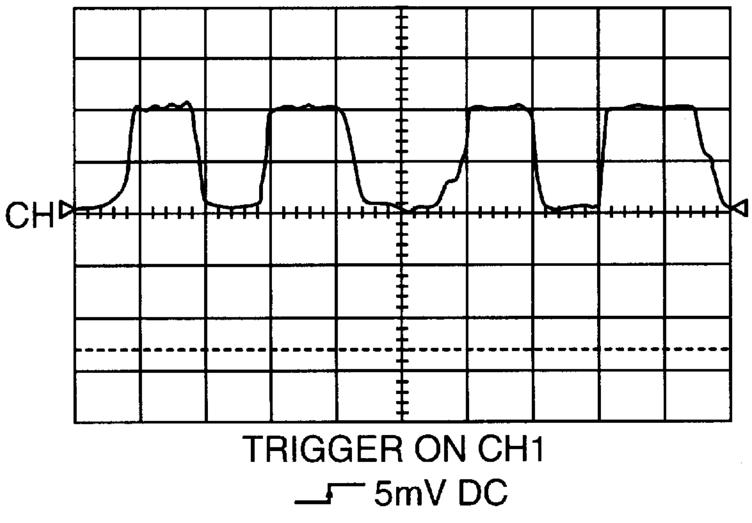
FIG. 3 is a graphical representation of a waveform recorded at the output of a photosensor placed in front of a fiber/shutter.

FIG. 3 is a graph which represents a waveform recorded at the output of a photosensor placed in front of a fiber/shutter constructed in accordance with the principles of the invention. The rise and fall time are shown to be in the range of 3 msec. The tip deflection is 2.5 mm for an active length of 25 mm and an applied voltage of 250V. Models with nonconstant thickness and width were also developed. The analytical formulations are very complex and solutions were found using approximation methods and symbolic programming. The results showed no improvement in rise time or deflection using non constant dimensions.

When the device is used, the starting consideration is that a screen consists of a large number of modules with relatively small size (for example, 180 mm×180 mm).

Figure 4:
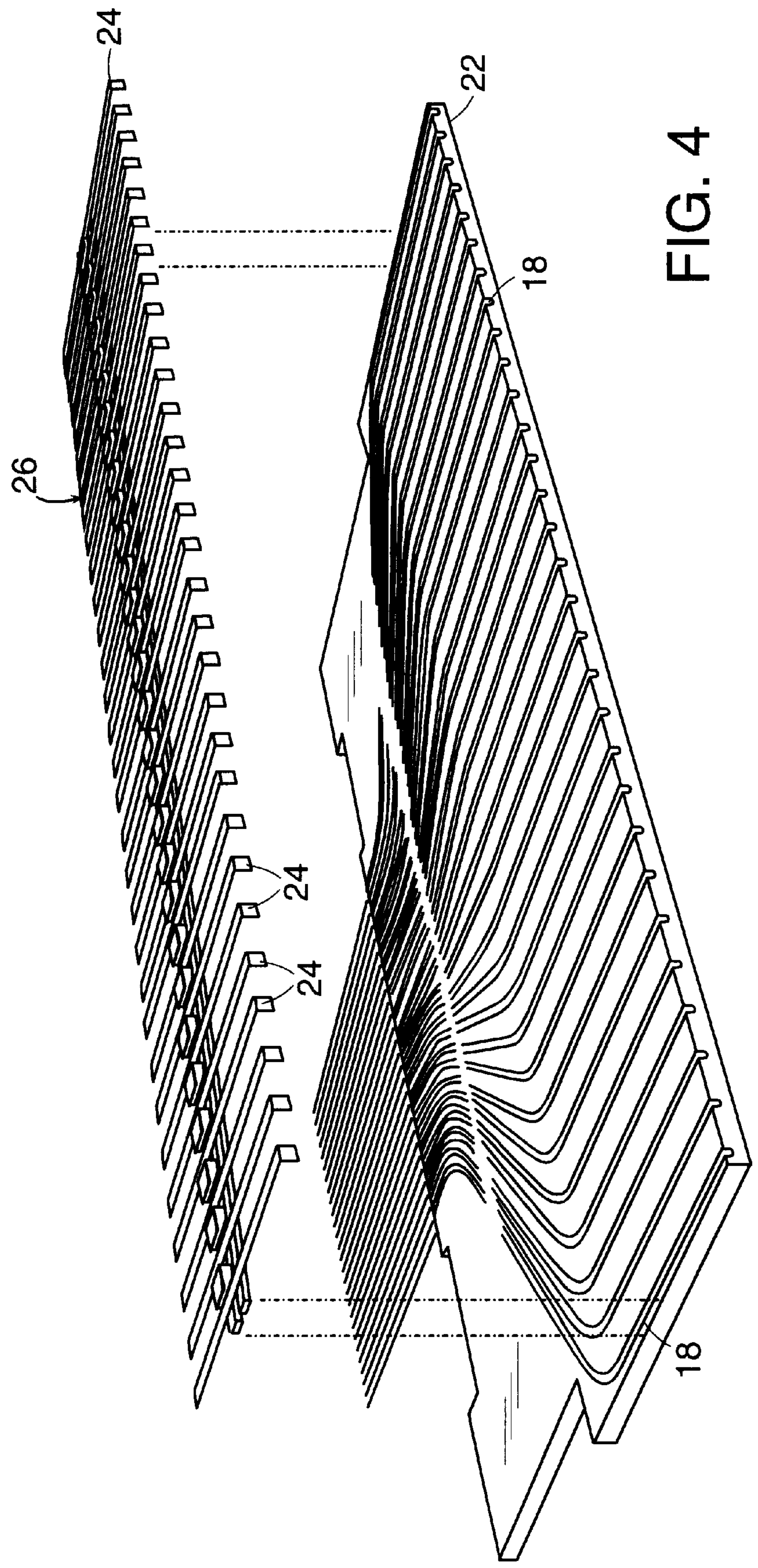
FIG. 4 is a perspective view of a preferred embodiment of the invention.
Figure 5:
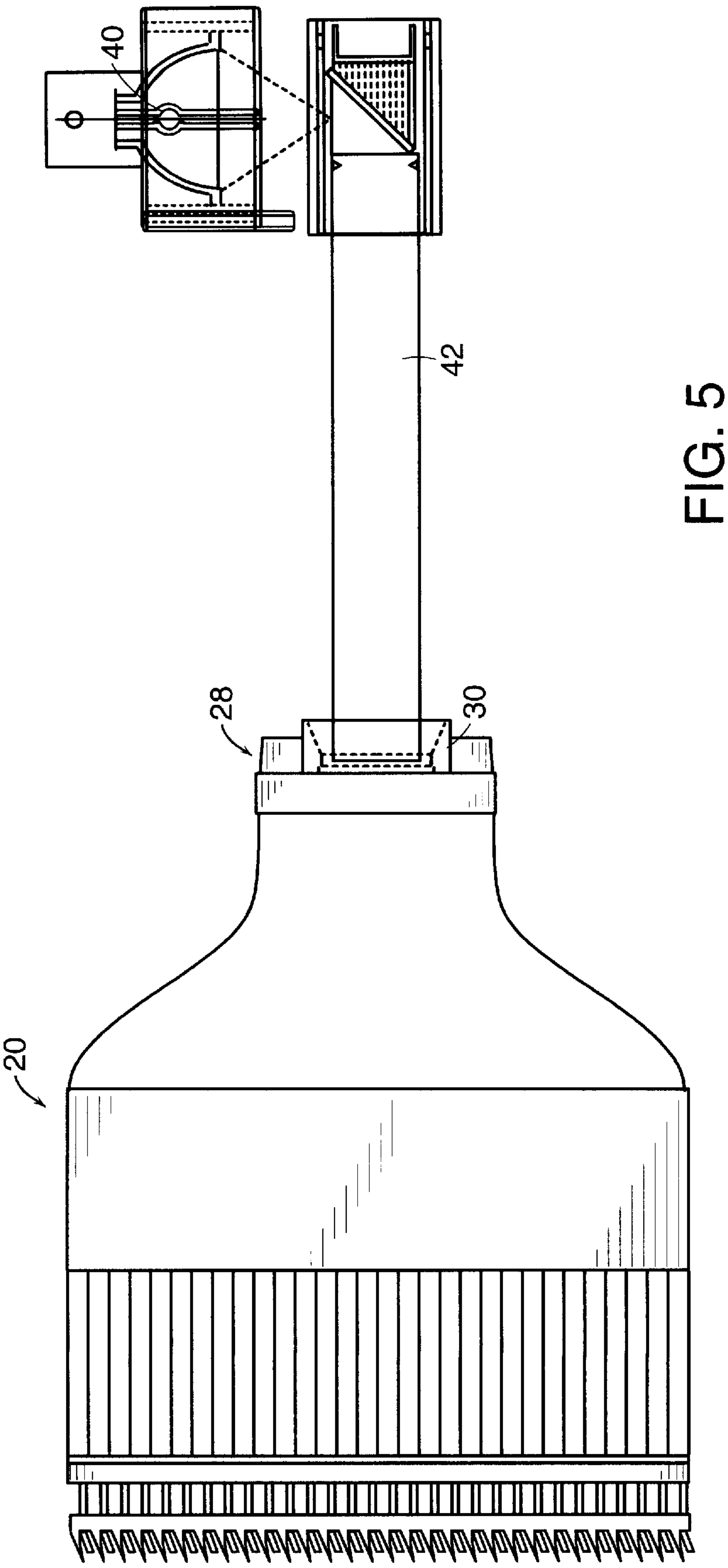
FIG. 5 is an elevational view of the embodiment illustrated in FIG. 4, including additional details with respect to the light source.

The basic element of each module 20 (FIG. 5) is formed by a plate 22. Each plate 22 itself contains a certain number of optical fibers 18, for example, thirty, as well as thirty shutters 24 in bimorph form arranged in a comb pattern 26, a PCB printed circuit wafer and the contacts required for controlling the shutters. This assembly is represented in a blown up view in FIG. 4. Each bimorph 14 is attached to a rigid or flexible mounting insert 27 (FIGS. 7*a*, 7*b*, 8*a*, 8*b*) in order to assemble a plurality of the bimorphs into the comb assembly 26. Thirty plates preferably constitute a module 20 as illustrated in FIG. 5, thus producing a network of thirty fibers by thirty fibers with a periodicity of 6 mm. The fibers are gathered at the back (upstream with respect to the direction of propagation of the passing light) of the module into three separate bundles 28, each plate being connected to a control printed circuit wafer. In addition, red, green and blue dichroic filters 30 are arranged before each respective bundle.

Preferably, the illumination is provided by a 60 Watt metal halide discharge lamp 40 (FIG. 5). The light is coupled in a mixer 42, which ensures a maximum and uniform illumination of the red, green, and blue bundle on each module. The illumination of the module 20 reaches a level of 20,000 Nits (Candela/$m^2$) at peak white. Each module surface is protected by a louvered optical network as illustrated in FIG. 5 so as to procure the required contrast and the angles of view. The optical network is designed to ensure, in addition, the thermal insulation of the module 20 by the use of a sandwich arrangement with an air gap.

When assembled, the spacing from module to module preserves the periodicity of approximately 6 mm between the fibers and there are no visible spacings or intervals.

Figure 6:
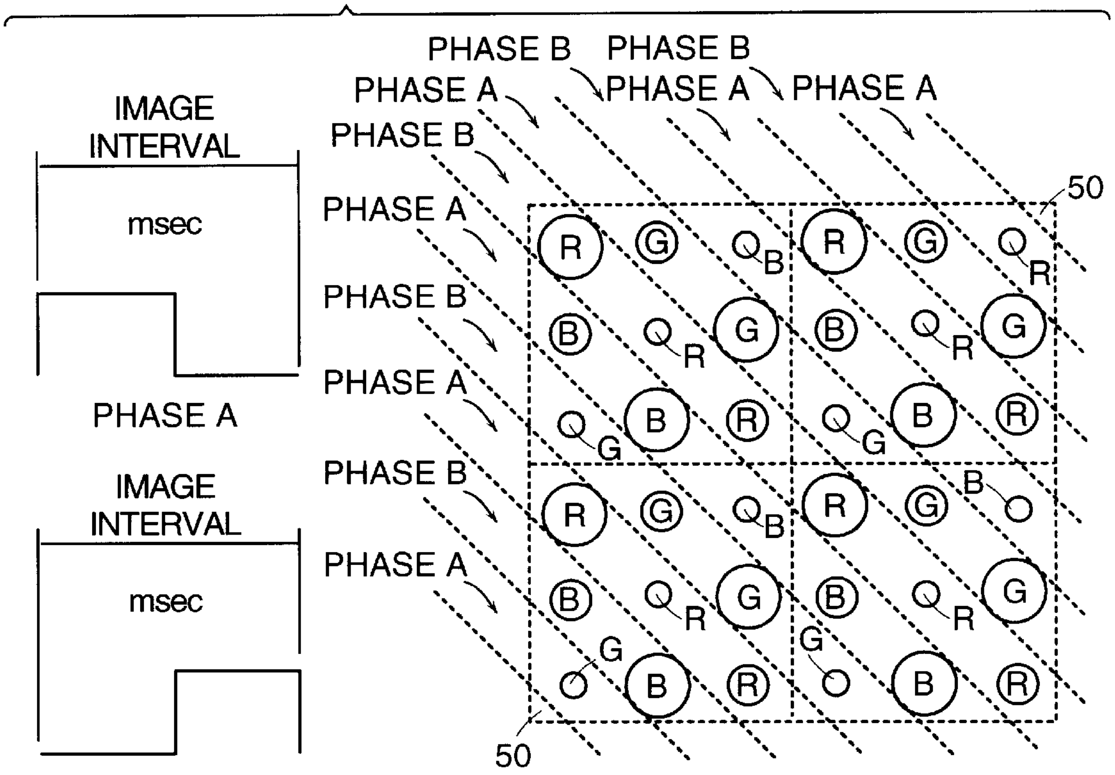
FIG. 6 is a schematic representation of the pixel layout of a screen module constructed in accordance with the principles of the invention.
Figure 7A:
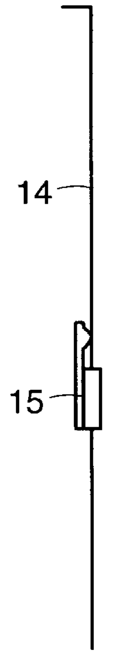
FIG. 7*a* is a side view of a single bimorph attached to a mounting insert.
Figure 7B:
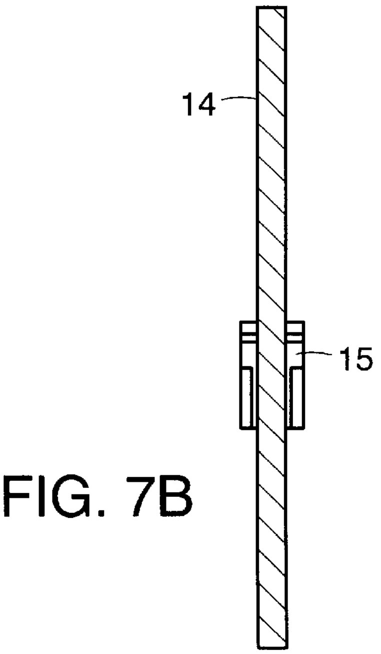
FIG. 7*b* is a plan view of a single bimorph attached to a mounting insert.
Figure 8B:
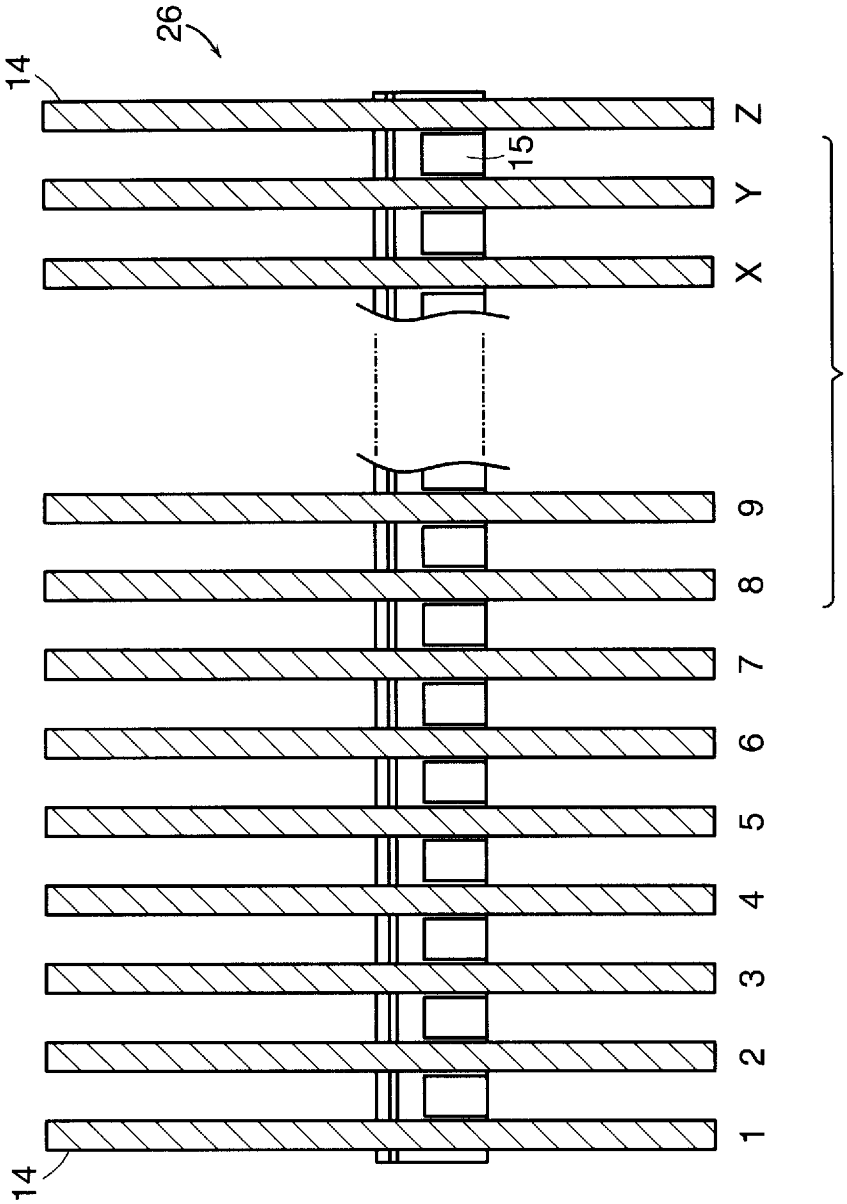
FIG. 8*b* is a plan view of a bimorph comb constructed in accordance with the principles of the invention.
Figure 8A:
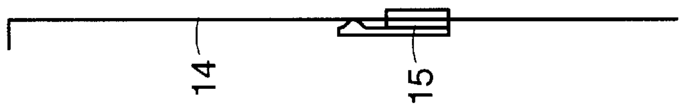
FIG. 8*a* is a side view of a bimorph comb constructed in accordance with the principles of the invention.

In the arrangement of the pixels 50 and the generation of a gray scale, the pixels each consist of nine fibers, three per color, as illustrated in FIG. 6. The colors are arranged according to a diagonal scheme, given that the eye is less sensitive to diagonal structures. The interval between successive pixels is preferably approximately 18 mm.

Because the bimorph of the present invention is primarily a device of the on-off type, the gray levels can be generated by modulation of the pulsewidth. Given the limited dynamics of the bimorph, the image cycle is transformed from the PAL or NTSC system into forty images per second using digital filtering. In general, and in the known devices, only three levels of gray can be generated. A problem also arises in view of the limits in the bandwidth of the mechanical frequency response of the bimorph with respect to the image refresh rate.

As a result of the devices that use three fibers of different sizes per color in a pixel, the number of gray levels can be increased, provided that the section of the fibers is in a correct ratio to avoid redundancies and to have a spacing with uniform level. In this embodiment, a surface ratio of one to three is used. Thus, if three levels are used per fiber, twenty-seven levels per color can be generated. This translates approximately into five bits per color.

Figure 9:
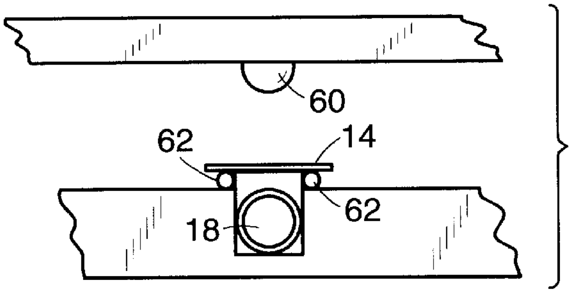
FIG. 9 is a front view illustrating the bump stops against which the bimorph makes contact in both the open and closed positions.

In operation, each of the optical fibers 18 may be selectively turned on and off (shuttered) by actuation of the bimorph 14 between an upper position, against one or more upper stops or bumps 60 (FIGS. 9 and 12), wherein the optical fiber 18 is open, and a lower position, against one or more lower stops or bumps 62 (FIGS. 9 and 13), wherein the shutter 24 covers the distal end of the corresponding optical fiber 18, so that the optical fiber is closed, thus preventing light from exiting therefrom. The bimorph makes contact with only the bump stops in both the open and closed positions.

Figure 12:
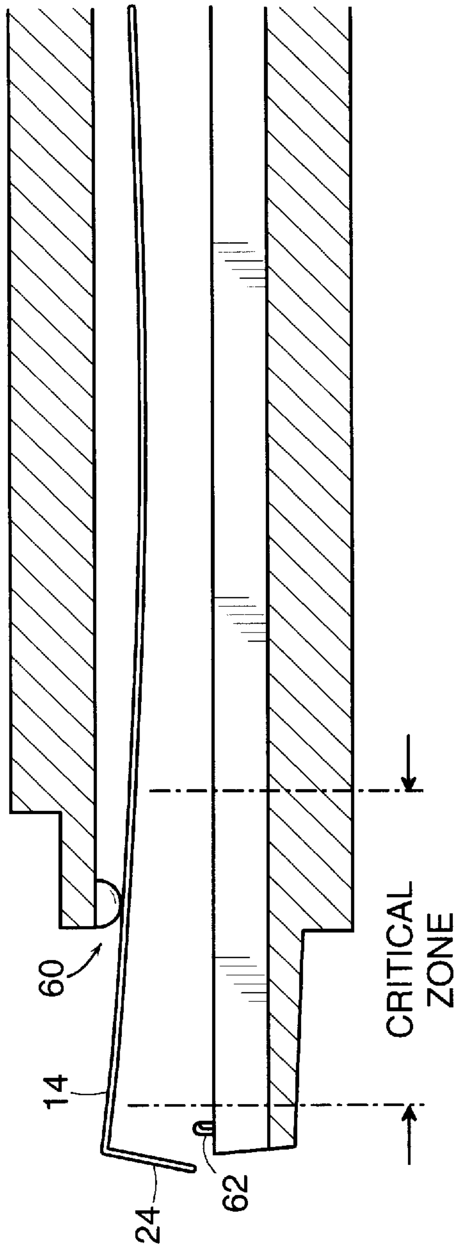
FIG. 12 is a cross-sectional side view of the bimorph of the invention illustrating the bimorph in the open (on) position.
Figure 13:
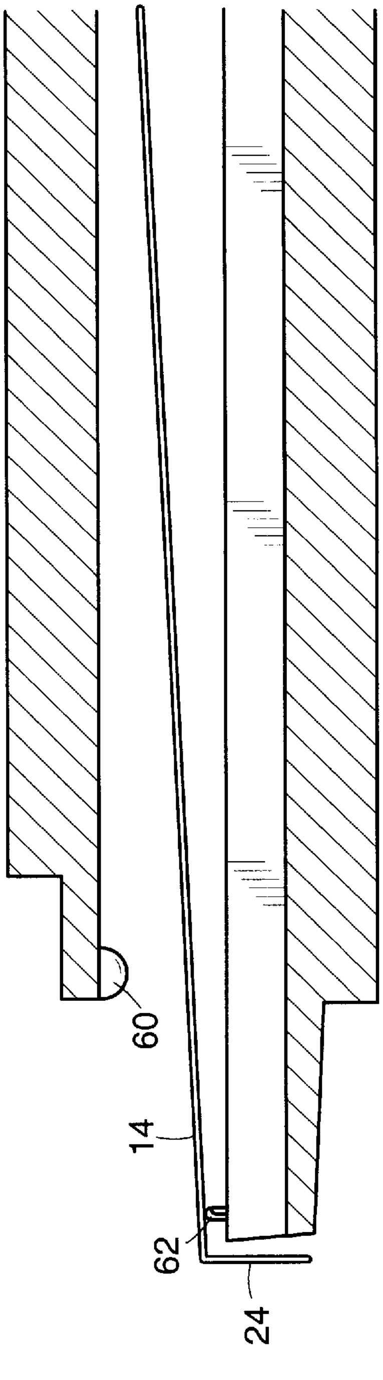
FIG. 13 is a cross-sectional side view similar to that of FIG. 12 of the bimorph of the invention illustrating the bimorph in the closed (off) position.

An important aspect of the invention is shown in FIG. 12. The upper bump 60 is disposed inside a critical zone extending as shown in FIG. 12, in order to ensure that any spurious vibration modes in the moving bimorph are dampened.

Figure 10:
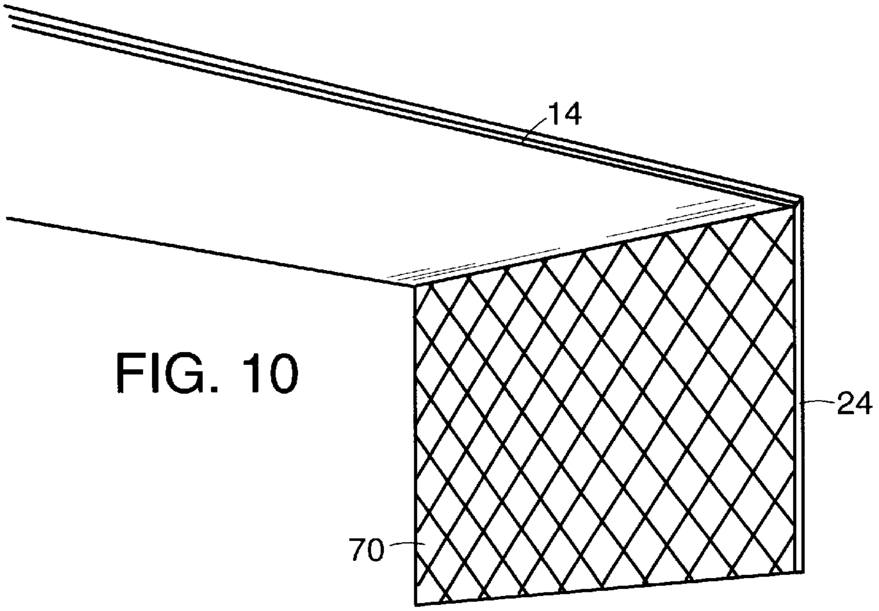
FIG. 10 is a perspective view of the underside of the bimorph of the invention, illustrating one embodiment where an infra-red coating is employed on the back of the shutter.
Figure 11:
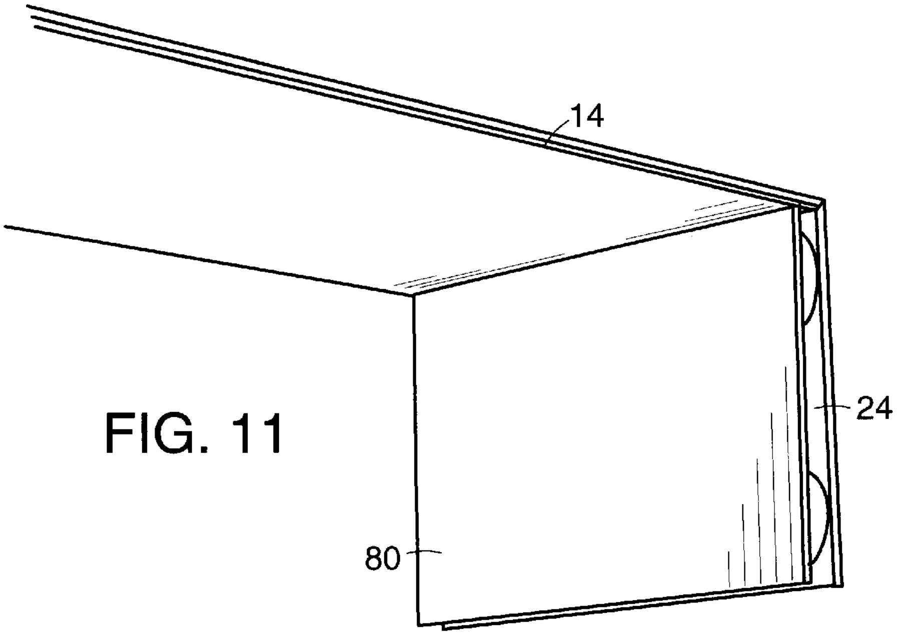
FIG. 11 is a perspective view similar to that of FIG. 10, of the underside of the bimorph of the invention, illustrating another embodiment where infra-red reflective foil is employed on the back of the shutter.

FIGS. 10 and 11 illustrate another advantageous concept of the present invention; namely, the employment of either an infra-red coating 70 (FIG. 10) or an infra-red reflective foil 80 (FIG. 11), which is attached to the back of the shutter 24 by means of adhesive or the like. This infra-red coating or foil reflects the heat generated by the light source, thereby protecting the shutter 24 from damage due to excessive heat.

Another embodiment is obtained by the use of an algorithm for distributing multilevel error diffusion with threshold modulation. The image rate can be sufficiently high to avoid flickering. The critical flickering frequency increases with the brightness or luminance and the surface dimension. In addition, the eye is less sensitive to the flickering of lines when the lines are diagonal. This effect has been used, as illustrated in FIG. 6, and it produces remarkable results.

With respect to the screen architecture, the modules 20 are arranged into subscreens of forty eight modules. The subscreens are combined to form a screen having any dimension or shape. The front surface is uniform, and there is no visible seam between the modules and the respective subframes.

While this invention has been described with respect to various specific examples and embodiments, it is to be understood that the invention is not limited thereto and that it can be variously practiced within the scope of the following claims.

What is claimed is:

1. An optical device comprising a) a plate;

b) a planar member; and c) a piezoelectric shutter system disposed between the plate and planar member, wherein the shutter system comprises i) a plurality of elongated bimorphs affixed to a transverse support in a comb pattern; and ii) shutters disposed at one end of and substantially perpendicular to the bimorphs, which shutters can be raised by a piezoelectric effect;

wherein at least one stop is disposed on the planar member in a critical zone above the bimorphs, said at least one stop being recessed from the shutters and adapted to diminish adhesion and vibration of the bimorphs.

2. The optical device of claim 1 wherein the bimorphs are affixed to the support with glue.

3. The optical device of claim 2 wherein the support is transparent to ultraviolet light.

4. A fiber optic track comprising a) a plate;

b) a planar member;

c) a piezoelectric shutter system disposed between the plate and planar member, wherein the shutter system comprises i) a plurality of elongated bimorphs affixed to a transverse support in a comb pattern; and ii) shutters disposed at one end of and substantially perpendicular to the bimorphs, which shutters can be raised by a piezoelectric effect;

wherein at least one stop is disposed on the planar member in a critical zone above the bimorphs, said at least one stop recessed from the shutters and adapted to diminish adhesion and vibration of the bimorphs; and d) a plurality of optical fibers disposed on the plate, wherein the shutters do or do not block light emanating from an end of the optical fibers according to whether the bimorphs are in an off or on position, respectively.

5. A fiber optic module comprising a plurality of the fiber optic tracks as in claim 4 stacked one on top of the other.

6. The fiber optic module of claim 5 wherein the plurality of fiber optic tracks stacked one on top of the other includes N optic tracks, each having N optical fibers, stacked one on top of the other to produce an approximately square array of N×N optical fibers.

7. The fiber optic module of claim 6 where N is approximately equal to thirty.

8. The fiber optic module of claim 5 wherein the fibers are gathered at the back of the module into separate bundles, each bundle transmitting light through a primary color filter.

9. The fiber optic module of claim 8 further comprising a metal halide discharge lamp as a source of light directed through the optical fibers.

10. The fiber optic module of claim 5 wherein the module's surface is protected by a louvered optical network that also provides desirable contrast and angles of view.

11. The fiber optic track of claim 4 further comprising a printed circuit wafer electrically connected to the shutters to control their movement.

12. A fiber optic track comprising a) a plate;

b) a planar member; and c) a piezoelectric shutter system disposed between the plate and planar member, wherein the shutter system comprises i) a plurality of elongated bimorphs affixed to a transverse support in a comb pattern;

ii) shutters disposed at one end of and substantially perpendicular to the bimorphs, which shutters can be raised by a piezoelectric effect; and iii) an infrared coating or reflective foil disposed on the shutters; and d) a plurality of optical fibers disposed on the plate;

wherein the shutters do or do not block light emanating from an end of the optical fibers according to whether the bimorphs are in an off or on position, respectively.

13. A fiber optic module comprising a plurality of the fiber optic tracks as in claim 12 stacked one on top of the other.

14. The fiber optic module of claim 13 wherein the plurality of fiber optic tracks stacked one on top of the other includes N optic tracks, each having N optical fibers, stacked one on top of the other to produce an approximately square array of N×N optical fibers.

15. The fiber optic module of claim 14 where N is approximately equal to thirty.

16. The fiber optic module of claim 13 wherein the fibers are gathered at the back of the module into separate bundles, each bundle transmitting light through a primary color filter.

17. The fiber optic module of claim 16 further comprising a metal halide discharge lamp as a source of light directed through the optical fibers.

18. The fiber optic module of claim 13 wherein the module's surface is protected by a louvered optical network that also provides desirable contrast and angles of view.

19. The fiber optic track of claim 12 further comprising a printed circuit wafer electrically connected to the shutters to control their movement.

20. A piezoelectric shutter system comprising a) a plurality of elongated bimorphs affixed to a transverse support in a comb pattern;

b) shutters disposed at one end of and substantially perpendicular to the bimorphs, which shutters can be raised by a piezoelectric effect; and c) an infrared coating or reflective foil disposed on the shutters.

21. The piezoelectric shutter of claim 1 wherein the bimorphs are affixed to the support with glue.

22. The piezoelectric shutter of claim 21 wherein the support is transparent to ultraviolet light.

23. A method for making an optical device comprising a) disposing a piezoelectric shutter system between a plate and a planar member, wherein the shutter system comprises i) a plurality of elongated bimorphs affixed to a transverse support in a comb pattern; and ii) shutters disposed at one end of and substantially perpendicular to the bimorphs, which shutters can be raised by a piezoelectric effect; and b) affixing one or more stops on the planar member in a critical zone above the bimorphs, said at least one stop being recessed from the shutters and adapted to diminish adhesion and vibration of the bimorphs.

24. The method for making an optical device of claim 23 further comprising setting glue by shining ultraviolet to affix the bimorphs to the support.

25. A method for making a piezoelectric shutter system comprising a) affixing a plurality of elongated bimorphs to a transverse support in a comb pattern;

b) bending one end of each of the bimorphs to form substantially perpendicular shutters, which shutters can be raised by a piezoelectric effect; and c) disposing an infrared coating or reflecting foil on the shutters.

26. The method for making a piezoelectric shutter system of claim 25 further comprising setting glue by shining ultraviolet light to affix the bimorphs to the support.

* * * * *